April 12, 1955  D. A. PARKER  2,706,059
CABLE LIFT TRAILER DRAWBAR
Filed Nov. 3, 1952  6 Sheets-Sheet 1
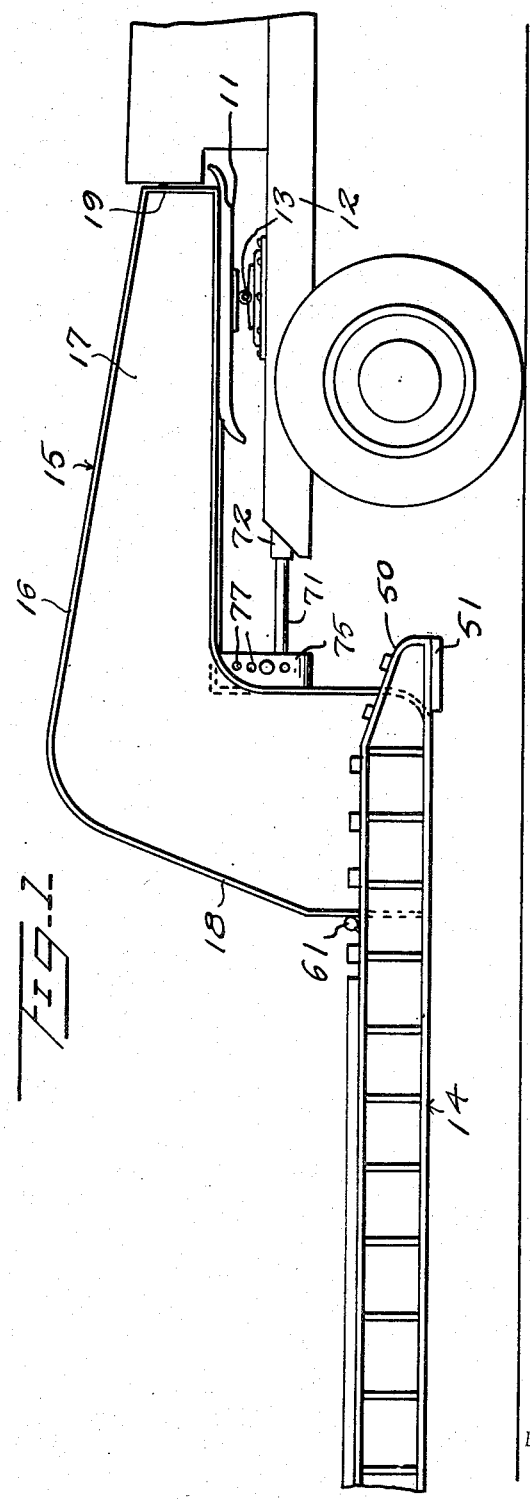
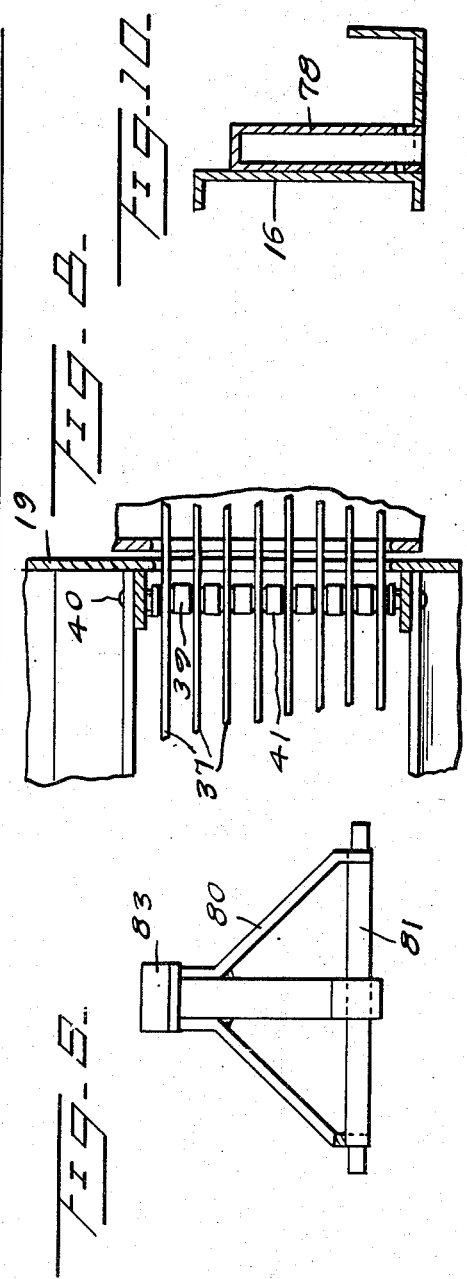
INVENTOR
Dean A. Parker
BY Kimmel & Crowell
ATTORNEYS

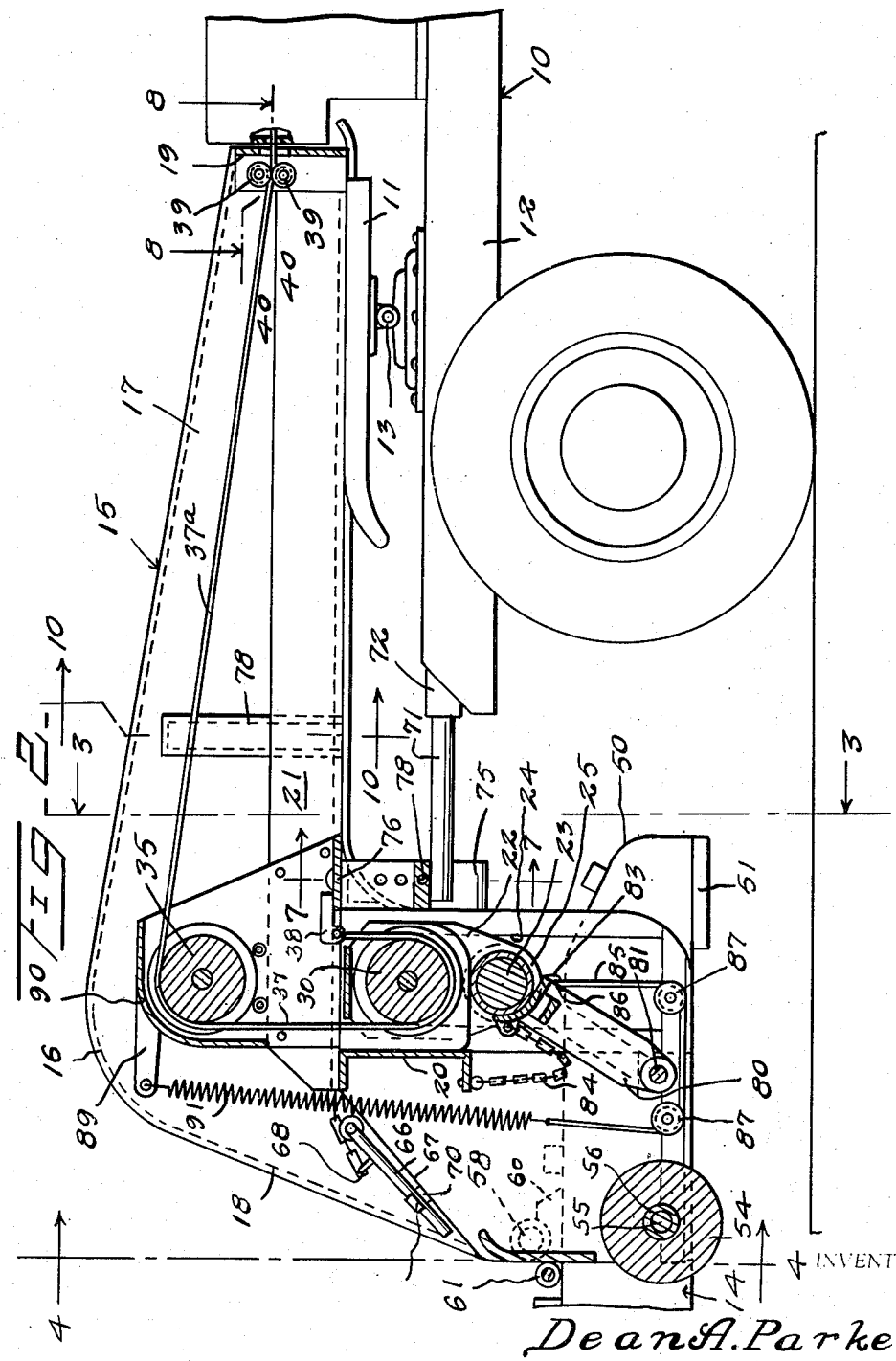

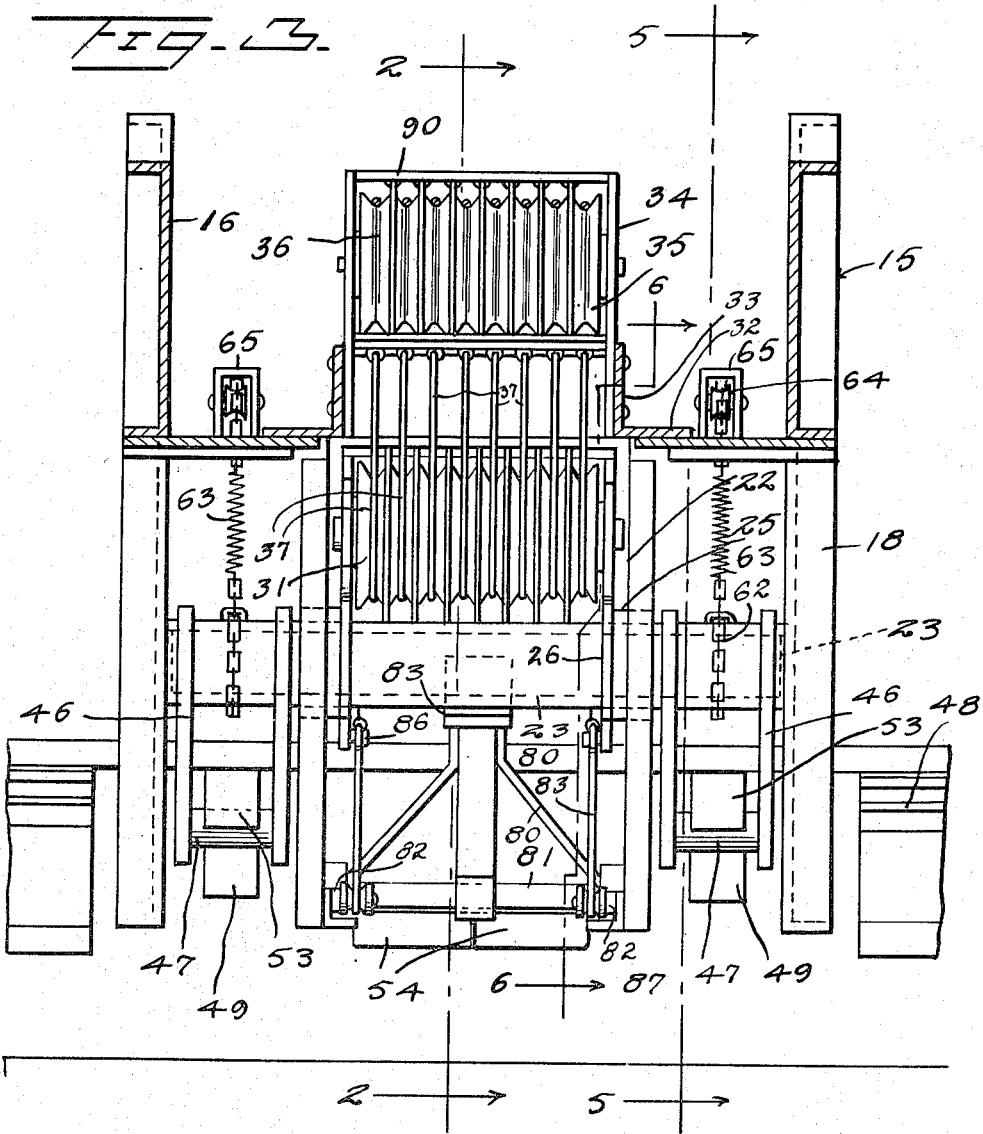

April 12, 1955 D. A. PARKER 2,706,059
CABLE LIFT TRAILER DRAWBAR
Filed Nov. 3, 1952 6 Sheets-Sheet 4
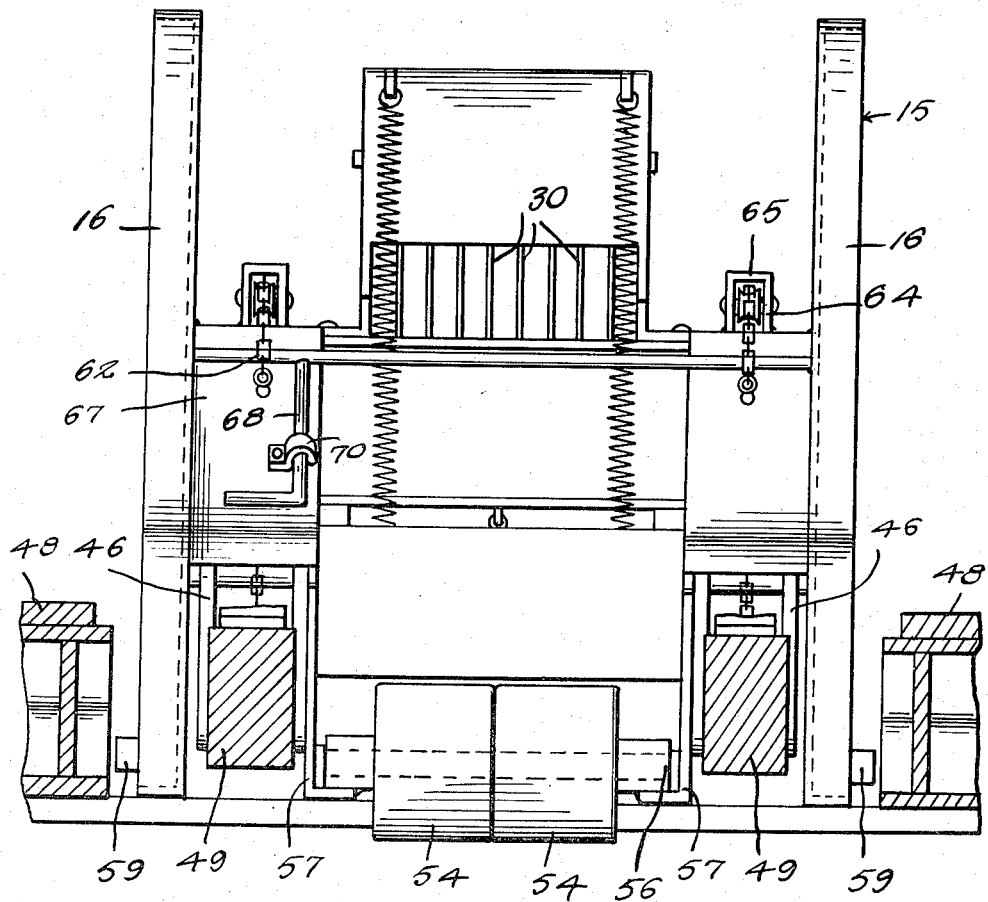
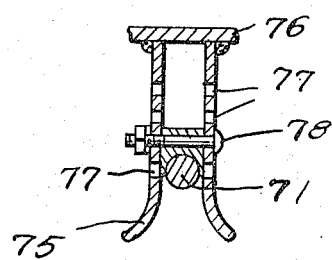
INVENTOR
Dean A. Parker
BY Kimmel & Crowell
ATTORNEYS April 12, 1955 D. A. PARKER 2,706,059
CABLE LIFT TRAILER DRAWBAR
Filed Nov. 3, 1952 6 Sheets-Sheet 5
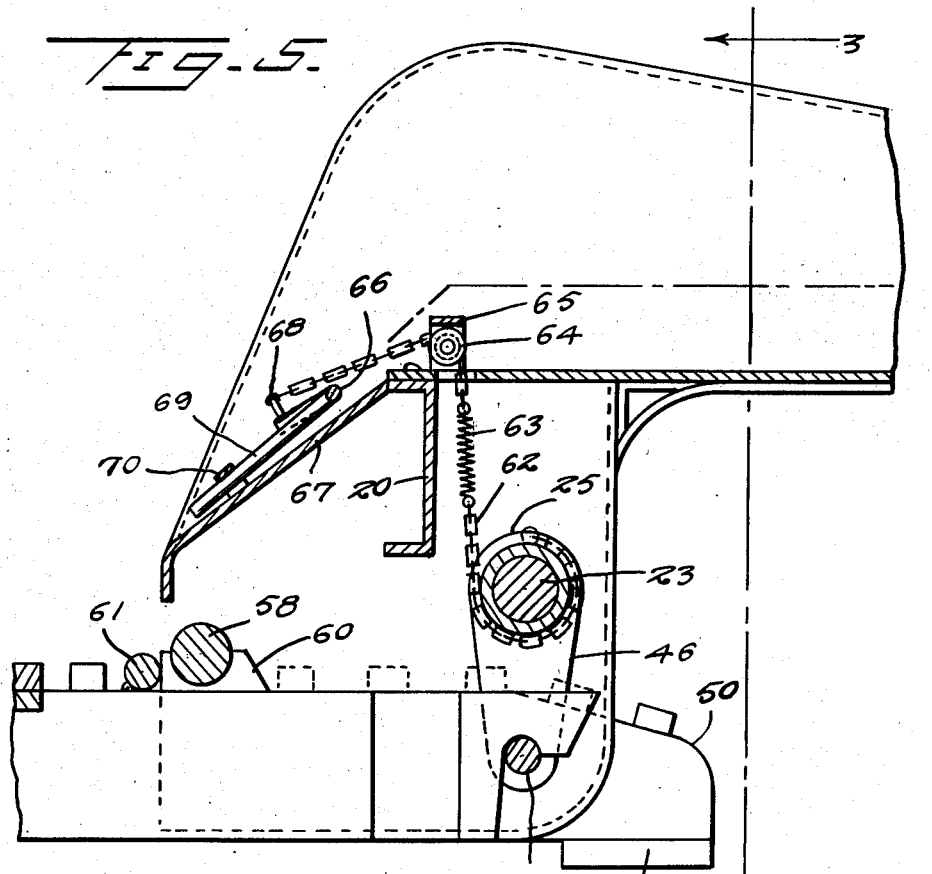
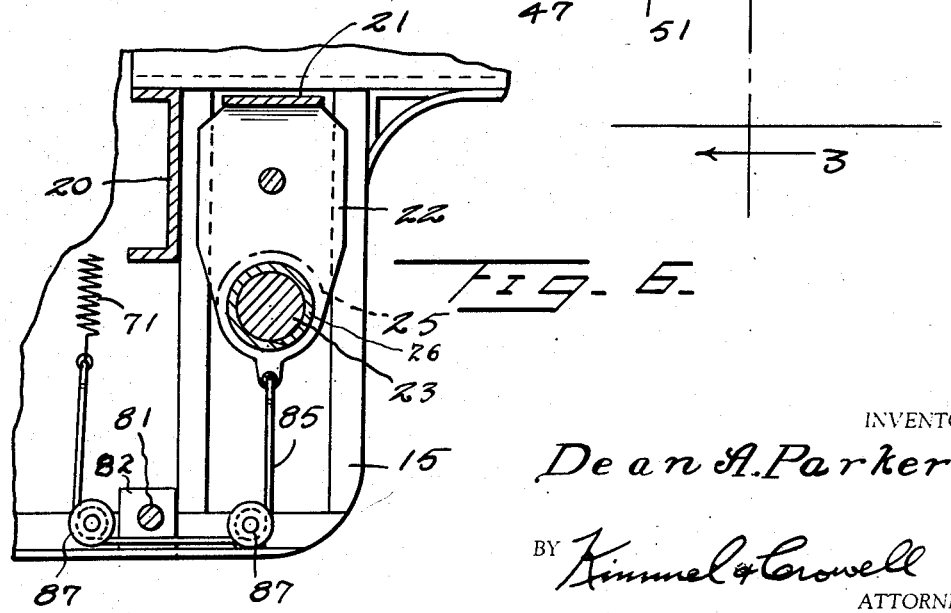
INVENTOR
Dean A. Parker
BY Kimmel & Crowell
ATTORNEYS

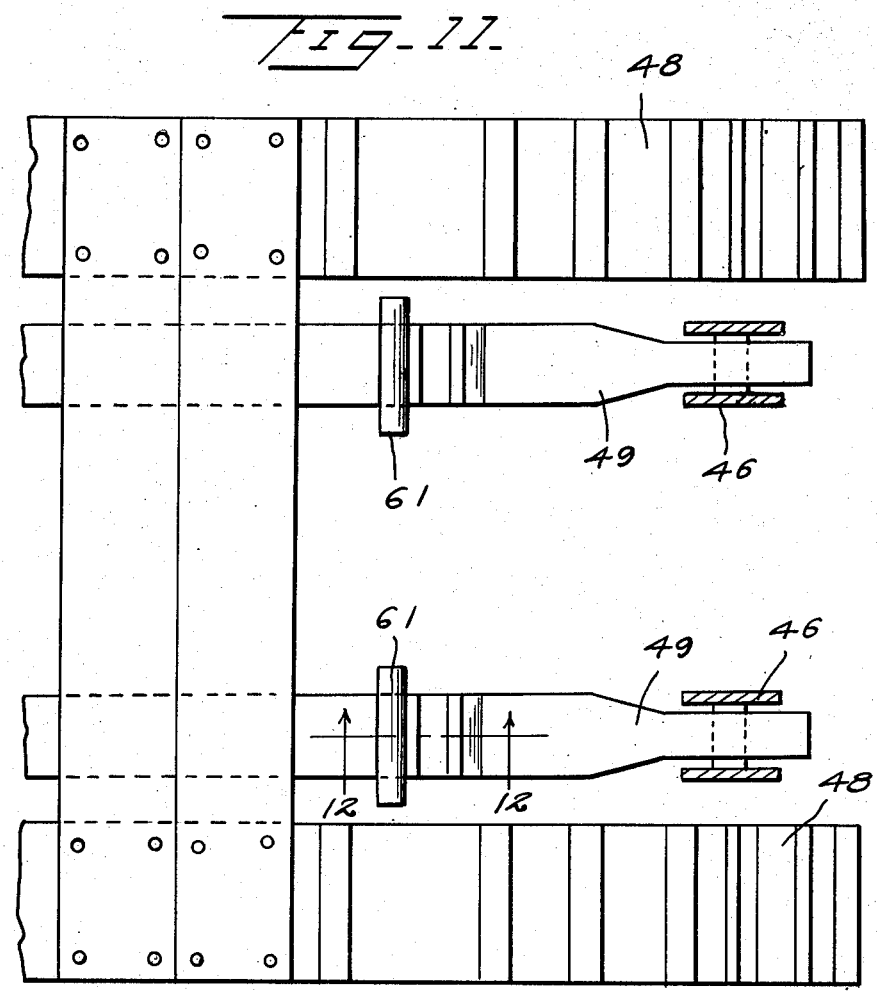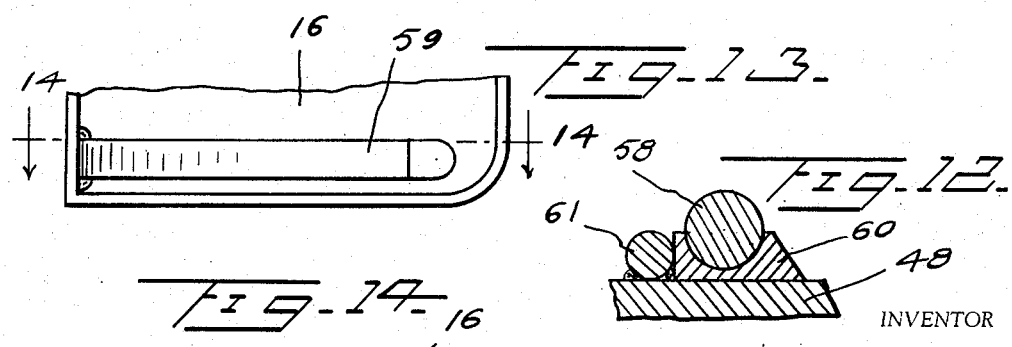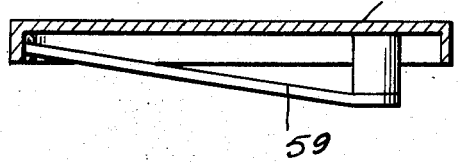

United States Patent Office 2,706,059
Patented Apr. 12, 1955

2,706,059

CABLE LIFT TRAILER DRAWBAR

Dean A. Parker, Richmond, Mich.

Application November 3, 1952, Serial No. 318,458

5 Claims. (Cl. 214—506)

This invention relates to a cable lift trailer drawbar coupling for a gooseneck coupling between a tractor vehicle and a low slung trailer.

A primary object of this invention is the provision of an improved trailer drawbar of the general type disclosed in my copending application Serial No. 197,393, filed November 24, 1950, now Patent No. 2,667,282 granted January 26, 1954, for Trailer Drawbar.

A further important object of the invention is the provision of an improved gooseneck or inverted L-shaped drawbar forming a coupling between a tractor vehicle and a low slung trailer, so constructed and arranged that the drawbar may be detached from, or connected with the trailer, with a minimum of effort and difficulty.

A further object of the invention is to provide in combination a detachable drawbar and trailer which will permit lowering of the trailer to a loading or unloading position, or raising of the forward end of the trailer to a towing position.

Still another object of the invention is the provision of such a device, including improved means actuated from a remote point such as the tractor vehicle cab, for raising and lowering the forward end of the trailer.

Still another object of the invention is the provision of remotely controlled means whereby the drawbar may be coupled or uncoupled from the trailer.

A more specific object of the invention is the provision of an improved locking means for connecting the drawbar and the trailer.

An additional specific object of the invention is the provision of an improved guide means for centering the towing vehicle with respect to the trailer and drawbar.

Still other objects reside in a combination of elements, arrangements of parts, and features of construction, all as will be more fully pointed out hereinafter and disclosed in the accompanying drawings wherein there is shown a preferred embodiment of this inventive concept.

In the drawings—

Figure 1 is a detail side elevational view partially broken away, of a towing vehicle, a low slung trailer, and a drawbar, constructed in accordance with the instant invention, Figure 2 is an enlarged vertical longitudinal sectional view taken through the drawbar and taken substantially along the line 2—2 of Figure 3, as viewed in the direction indicated by the arrows, Figure 3 is an enlarged sectional view taken substantially along the line 3—3 of Figure 2, and of Figure 5 as viewed in the direction indicated by the arrows, Figure 4 is an enlarged sectional view taken substantially along the line 4—4 of Figure 2, as viewed in the direction indicated by the arrows, Figure 5 is a sectional view taken substantially along the line 5—5 of Figure 3, as viewed in the direction indicated by the arrows, Figure 6 is a fragmentary sectional view taken substantially along the line 6—6 of Figure 3, as viewed in the direction indicated by the arrows, Figure 7 is an enlarged sectional view taken substantially along the line 7—7 of Figure 2, as viewed in the direction indicated by the arrows, Figure 8 is a fragmentary enlarged sectional view taken substantially along the line 8—8 of Figure 2, as viewed in the direction indicated by the arrows, Figure 9 is a fragmentary plan view of a constructional detail, Figure 10 is an enlarged sectional view taken substantially along the line 10—10 of Figure 2, as viewed in the direction indicated by the arrows, Figure 11 is a fragmentary top plan, partly in section, of the forward end of the trailer frame, Figure 12 is a fragmentary section taken on the line 12—12 of Figure 11, Figure 13 is a fragmentary side elevation of the lower rear end of the drawbar, Figure 14 is a section taken on the line 14—14 of Figure 13.

Similar reference characters refer to similar parts throughout the several views of the drawings.

Referring now to the drawings in detail, there is generally indicated at 10 a tractor vehicle of conventional construction, which is provided with the customary fifth wheel 11 carried by a frame 12. The fifth wheel 11 is rockably mounted in the conventional manner by a horizontally disposed pivot pin 13. A low slung trailer member generally indicated at 14 is disposed rearwardly of the tractor vehicle and is adapted to be connected with the tractor vehicle 10 by means of a detachable drawbar structure generally indicated at 15.

Drawbar structure 15 includes a main frame formed of a pair of spaced L-shaped members 16, having a substantially horizontal upper side 17 and a depending rear side or leg 18. The two spaced L-shaped members 16 are connected together at their forward ends by means of connecting members 19, and at their rear portions by means of a rear transverse beam 20. Beams 19 and 20 may be of any desired conventional configuration but in the illustrative embodiment shown are preferably of channel shape.

A plate 21 is secured to the upper side of the beam 20 and fixed between the rear sides 18 of the frame members 16, and a pair of inner frame members or plates 22 are spaced inwardly from the rear sides 18, the purpose of which will be hereinafter described.

A horizontally disposed vertically movable shaft 23 is disposed between the rear sides 18 and is vertically movable in slots or guides 24 formed in the inner frame members 22. Shaft 23 is provided with a pair of flanged collars 25 rotatably disposed thereon which loosely engage in the guide slots 24, the collars 25 are held against inward movement as by means of collars 26 secured to the shaft 23.

Mounted between plates 22 journalled for rotation therein is a roller 30, provided with a series of grooves or channels 31 therein. Positioned above the plate 21 are a pair of channel members 32 having inwardly positioned upwardly extending flanges 33, between which flanges are positioned a pair of spaced plates 34, between which plates is journalled a second roller 35 provided with grooves or channels 36. A series of cables 37 have their ends fixedly secured to a plate or bar member 38 adjacent the forward under-side of roller 35 and extend downwardly beneath roller 30, seating in the grooves or channels 31 and thence upwardly over roller 35, seating in the grooves 36. The cables then extend forwardly, as indicated at 37a, to the front of the drawbar, between a pair of guide rollers or pulleys 39, mounted on axles 40 (see Fig. 8) and having grooves or channels 41 therein, outwardly through an opening in plate 19 to a suitable winch or other source of power contained in the body of the tractor vehicle.

It will thus be apparent that as the cables are drawn forwardly, lower roller or pulley 30 is raise, together with its associated frame, including plates 21 and 22, which action consequently raises shaft 23, and when drawbar 15 is connected to trailer 14 in a manner to be described more fully hereinafter, simultaneously raises the trailer.

The shaft 23 has fixed thereto adjacent the opposite ends thereof a pair of clevises 46 which include a connecting pin 47.

Referring now to Figure 4, the trailer 14 includes a pair of parallel forwardly extending frame members 48 and a pair of forwardly projecting hooks or keepers 49 which are positioned between the frame extension members 48.

The frame extension members 48 are provided with downwardly inclined forward ends 50, and a shoe 51 is secured to the lower side of each frame extension member 48. The inclined forward portions 50 provide the track at the forward end of the trailer 14 so that when the forward end of the trailer is lowered with the shoes 51 engaging with the ground or road, the article which is to be loaded onto the trailer may be moved upwardly over the inclined track 50. Each keeper or hook 49 is formed with a downwardliy and rearwardly inclined nose 52 and an arcuate keeper slot 53 within which a pin 47 is adapted to releasably engage. Drawbar 15 has secured to the lower rear portions of the inner frame members 22 a pair of wheels 54 which are rotatably mounted on a shaft 55 carried by bearings 56.

The bearings 56 are secured to angle members 57 which are fixed to the inner sides of the plates or inner frame members 22. The rollers or wheels 54 project downwardly a slight distance below the rear lower end of the drawbar 15 and are adapted to engage the ground or road when the drawbar 15 is uncoupled from the trailer or when the trailer 14 has been lowered to a loading or unloading position.

The drawbar 15 is guided between the extension members 48 by means of tapered guide members 59 carried by the outer sides of the L-shaped members 16. A cross shaft 58 may be welded between the side members 18 and is adapted to engage in an open bearing 60 carried by the upper side of a keeper member 49 when the drawbar is in coupled position with respect to the trailer 14.

The shaft 58 provides a fulcrum by means of which the drawbar structure 15 is adapted to be rocked relative to the trailer 14 for elevating or lowering the trailer and the drawbar structure. The keeper members 49 have welded thereto stop bars 61 which are fixed to the upper sides of the keeper members 49 and are adapted to be engaged by the rear ends of the L-shaped members 16.

In order to provide a means whereby the clevises 46 may be yieldably urged to a coupling position, a pair of chains 62 are secured to the shaft 23 adjacent the outer end portions thereof, and a spring 63 is interposed in each chain 62. Each chain 62 engages over a grooved roller 64 rotatably mounted through an inverted U-shaped member 65 which is secured to the upper side of the plate 21. A shaft 66 is rotatably carried by a downwardly and rearwardly inclined plate 67 which is secured to an outer frame member 16 and an adjacent inner frame member 22. The shaft 66 has fixed thereto a lever or arm 68, and a crank lever 69 is also secured to the shaft 66 and is adapted to engage a latch hook 70 carried by one of the plates 67. The chain 62 is partly wound about the shaft 23, as shown in Figure 3, and when the crank 69 is in locked position, as shown in Figure 3, the shaft 23 is yieldably urged to rotate in a clockwise direction.

When the clevises 46 are to be uncoupled from the keeper members or hooks 49 the crank 69 is raised upwardly to release the tension on the chains 62 in order that the clevises 46 may gravitatingly swing downwardly to substantially vertical position. It will be understood that when the crank 69 is raised upwardly to a released position the assembly will then be lowered to disengage the locking pins 47 from the keepers 53.

In order to provide a means whereby the drawbar structure 15 will be held in alignment with the tractor vehicle 10 during the coupling of the drawbar with the trailer 14, I have provided an extensible shaft 71 which is slidable in a guide sleeve 72 carried by the frame 12 of the tractor 10.

A flared fork 75 is secured to a plate 76 carried by the frame members 16, and provided with aligned apetures 77 through a selected aligned pair of which may extend a pin 78 for vertical alignment of shaft 71. Shaft 71 may be extended into centering position or retracted at will.

Suitable sockets 78 are provided in drawbar 15 and secured to the sides 16 thereof, as indicated in Figure 10, and form seats for supports for the drawbar when the latter is disassembled from the tractor vehicle.

Improved means are provided for locking the drawbar in assembled relation with the trailer vehicle, and comprise a fork or clevis 80 including a cross shaft 81 journalled in suitable bearings 82 carried by frame 14. Fork 80 is provided at its upper end with a shoe 83, adapted to engage when in locking position beneath the shaft 23. A locking chain 84 secured to shoe 83 at one end, and at its other end to cross member 20 serves to limit the pivotal movement of the locking member.

Means are provided for yieldably holding the locking member in locked position, and comprise a cable 85, secured as at 86 to member 80, and extending downwardly about a pair of spaced rollers 87 and 88 carried by the frame assembly, and thence extending upwardly to rods or elongated members 89 which extend rearwardly from a top 90 or covering extending over extremities of plates 34. A spring 91 is interposed between extensions 89 and cables 85 and the arrangement is such as to resiliently bias shoe 83 towards locking position, as shown best in Figs. 2 and 6.

In the use and operation of this drawbar structure, assuming that the trailer 14 is in the lowered position with the drawbar disengaged from the trailer, the tractor 10 is backed toward the trailer 14, and at this time the drawbar 15 will be locked relative to the tractor 10. The shaft 23 will be lowered by cables 30 to a position whereby the coupling pins 47 may ride downwardly on the inclined noses of the keeper members 49. The shaft 23 will be under tension by lowering of the crank 69 to the shaft tensioning position. The clevises 46 will snap into the keeper members 53 at the time the rear end of the drawbar 15 abuts the stop members 61.

The drawbar 15 with the forward end of the trailer 14 may be elevated to an operating position by tightening cables 30 to raise the assembly, including plate 21 and shaft 23. Raising of the assembly will elevate the cross shaft 23 so that the trailer frame 14 will be raised at its forward end with the bearing plates 60 engaging the upper sides of the keeper members or hooks 49. In the normal running or moving position of the trailer the trailer will be disposed in a substantially horizintal position, as shown in Figure 1.

In the event it is desired to elevate the trailer frame at its forward end to a position above the horizontal, this can be accomplished by further raising the shaft 23 and the clevises 46. The drawbar structure 15 may be uncoupled from the trailer 14 and the latter disposed in either a loading or unloading position by lowering the assembly and releasing the shaft 23 from the tension of the chain 62.

The structure hereinbefore described will provide a detachable drawbar structure which will facilitate the loading or unloading of the trailer and will also provide a means whereby the forward end of the underslung or low slung trailer may be raised to pass over ridges or humps which may be ecountered in a road or other position.

As many embodiments may be made of this inventive concept, and as many modifications may be made in the embodiment hereinbefore shown and described, it is to be understood that all matter herein is to be interpreted merely as illustrative and not in a limiting sense.

What I claim is:

1. In combination with a tractor vehicle having a fifth wheel, a trailer, an inverted L-shaped drawbar having a forward end attached to said fifth wheel, reciprocably slidable movable means mounted on said drawbar for vertical movement with respect thereto whereby said movable means may assume various heights from the ground, actuating means comprising a movable multi-groove pulley adjacent said movable means. a fixed multi-groove pulley aligned with said movable pulley, and plural independent cable means extending beneath said first pulley and over said second pulley, means securing said cable means to a fixed support above said first pulley, and power means for moving said cable means, said actuating means being adapted for raising or lowering said movable means.

2. In combination with a tractor vehicle having a fifth wheel, a trailer, an inverted L-shaped drawbar having a forward end attached to said fifth wheel, reciprocably slidable movable means mounted on said drawbar for vertical movement with respect thereto whereby said movable means may assume various heights from the ground, actuating means comprising a movable multi-groove pulley adjacent the said movable means, a fixed multi-groove pulley aligned with said movable pulley, and plural independent cable means extending beneath said first pulley and over said second pulley, means securing said cable means to a fixed support above said first pulley, power means for moving said cable means, said actuating means being adapted for raising or lowering said movable means, and coupling means for connecting the forward end of said trailer to said movable means whereby the height of said trailer end may be varied.

3. In combination with a tractor vehicle having a fifth wheel, a trailer, an inverted L-shaped drawbar having a forward end attached to said fifth wheel, reciprocably slidable movable means mounted on said drawbar for vertical movement with respect thereto whereby said movable means may assume various heights from the ground, actuating means comprising a movable pulley adjacent said movable means, a fixed pulley aligned with said movable pulley, and cable means extending beneath said first pulley and over said second pulley, means securing said cable means to a fixed support above said first pulley, power means for moving said cable means, said actuating means being adapted for raising or lowering said movable means, coupling means for connecting the forward end of said trailer to said movable means whereby the height of said trailer end may be varied, locking means for securing said movable means in raised position, spring means normally biasing said locking means to locking position, said last-mentioned means comprising a plurality of pulleys carried by the base of said drawbar, a cable extending beneath said pulleys from a point above said locking means to a point below said locking means, and spring means interposed in said cable.

4. In combination with a tractor vehicle having a fifth wheel, a trailer, an inverted L-shaped drawbar having a forward end attached to said fifth wheel, reciprocably slidable movable means mounted on said drawbar for vertical movement with respect thereto whereby said movable means may assume various heights from the ground, actuating means comprising a movable pulley adjacent said movabe means, a fixed pulley aligned with said movable pulley, and cable means extending beneath said first pulley and over said second pulley, means securing said cable means to a fixed support above said first pulley, power means for moving said cable means, said actuating means being adapted for raising or lowering said movable means, coupling means for connecting the forward end of said trailer to said movable means whereby the height of said trailer end may be varied, pivotally mounted locking means for securing said movable means in raised position, spring means normally biasing said locking means to locking position, said last-mentioned means comprising a plurality of pulleys carried by the base of said drawbar, a cable extending beneath said pulleys from a point above said locking means to a point below said locking means, and spring means interposed in said cable.

5. In combination with a tractor vehicle having a fifth wheel, a trailer, an inverted L-shaped drawbar having a forward end attached to said fifth wheel, reciprocably slidable movable means mounted on said drawbar for vertical movement with respect thereto whereby said movable means may assume various heights from the ground, actuating means comprising a movable pulley adjacent said movable means, a fixed pulley aligned with said movable pulley, and cable means extending beneath said first pulley and over said second pulley, means securing said cable means to a fixed support above said first pulley, power means for moving said cable means, said actuating means being adapted for raising or lowering said movable means, coupling means for connecting the forward end of said trailer to said movable means whereby the height of said trailer end may be varied, locking means for securing said movable means in raised position, said locking means including a shoe engaging said movable means, and means pivotally mounting said shoe on the base of said drawbar, spring means normally biasing said locking means to locking position, said last-mentioned means comprising a plurality of pulleys carried by the base of said drawbar, a cable extending beneath said pulleys from a point above said locking means to a point below said locking means, and spring means interposed in said cable.

References Cited in the file of this patent

UNITED STATES PATENTS

| 1,346,160 | Barlow | July 13, 1920 |
| 1,937,062 | Kellett | Nov. 28, 1933 |
| 2,316,760 | Andersen et al. | Apr. 20, 1943 |
| 2,449,947 | Meadows | Sept. 21, 1948 |
| 2,545,584 | Meadows | Mar. 20, 1951 |
| 2,590,181 | Keesler | Mar. 25, 1952 |
| 2,613,945 | Talbert | Oct. 14, 1952 |
| 2,678,188 | Rogers | May 11, 1954 |